(12) United States Patent
Fukusaka (10) Patent No.: US 7,626,725 B2
(45) Date of Patent: Dec. 1, 2009

(54) IMAGE READING APPARATUS

(75) Inventor: Tetsuro Fukusaka, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 524 days.

(21) Appl. No.: 11/390,706

(22) Filed: Mar. 28, 2006

(65) Prior Publication Data

US 2006/0227392 A1    Oct. 12, 2006

(30) Foreign Application Priority Data

Apr. 6, 2005    (JP) .............................. 2005-109893

(51) Int. Cl.
*H04N 1/04* (2006.01)
(52) U.S. Cl. ...................... 358/1.9; 358/1.13; 358/474
(58) Field of Classification Search ................. 358/1.1, 358/1.9, 3.21, 1.13, 401, 448, 464, 474, 296
See application file for complete search history.

(56) References Cited

U.S. PATENT DOCUMENTS 5,542,007 A * 7/1996 Chevion et al. ............. 382/232
2006/0209356 A1 * 9/2006 Sekizawa et al. ............ 358/448
2006/0209363 A1 * 9/2006 Suenaga et al. ............. 358/474

FOREIGN PATENT DOCUMENTS

| JP | 07-038713 A | 2/1995 |
|---|---|---|
| JP | 2001-236463 A | 8/2001 |
| JP | 2006-261993 A | 9/2006 |

* cited by examiner

*Primary Examiner*—Thomas D Lee
(74) *Attorney, Agent, or Firm*—Canon U.S.A., Inc. I.P. Division

(57) ABSTRACT

To determine an area of a whiteout applied on an original, an area in which an output of a CCD is saturated is determined to be a correction trace area based on image read in an exposure-down having exposure reduced from a normal exposure amount. Correction trace information obtained by determining and detecting the correction trace area is correlated with image data to be stored as attribute information of an image file. When the image file is displayed on a PC screen, the correction trace area of an original image read based on position information of a correction trace contained in the attribute information transferred from an image reading apparatus is highlighted.

8 Claims, 9 Drawing Sheets

IMAGE READING APPARATUS

BACKGROUND OF THE INVENTION

1. Field of the Invention

The present invention relates to an image reading apparatus adapted for reading an original image and for converting it into digital data.

2. Description of the Related Art

There has recently been an expectation that a chance to convert image information of a great volume of documents into electronic data and to store the data will increase even at an administrative institution. Besides, to utilize the converted electronic data as official documents which become legally valid, a need to convert paper documents into electronic data more faithfully has increased.

In the case of a conventional image reading apparatus, however, when a document with a correction trace by a whiteout or a falsified document is read, it is impossible to determine whether it is a corrected document or not from electronic data, thus reducing reliability of an original.

To detect a whiteout or the like on an original in the image reading apparatus of such a type, the following method has conventionally been available. According to this method, reflected light of light applied to the surface of a form (original) from a light source for reflected light is read by a first sensor, and transmitted light of light applied to the backside of the form from a light source for transmitted light is read by a second sensor. A difference is taken between outputs of the first and second sensors. When an occupation ratio of a black image in this difference image is larger than a predetermined value, application of a whiteout is determined (e.g., see Japanese Patent Application Laid-Open No. 2001-236463).

When an original having an uneven surface or a metal of a high surface reflectance is read, a method of preventing a whitish image caused by saturation of charges stored in a charge-coupled device (CCD) may be employed. According to this method, when the charges stored in the CCD are saturated, a driving voltage for an illumination halogen lamp is reduced to decrease a quantity of light applied to the original, thereby increasing an amplification degree of an output signal from the CCD (e.g., see Japanese Patent Application Laid-Open No. 07-038713).

However, even in the case of the configuration capable of detecting a whiteout, application of the whiteout is only detected, and the two light sources and the two sensors are necessary only for the detection, thus causing a problem of high costs. Furthermore, in the case of the technology for decreasing the quantity of light applied to an original, a void image caused by saturation of a CCD itself by a whiteout or the like is only prevented, thus causing a problem of impossible detection of a correction trace by the whiteout.

SUMMARY OF THE INVENTION

The present invention is directed to an image reading apparatus capable of making (highlighting) a correction trace of a read image easily seen when a paper document is converted into electronic data (image file) to be stored.

The present invention is further directed to an image reading apparatus capable of selecting both of a mode of detecting a correction trace of an original and a normal original reading mode as occasion demands.

According to a first embodiment of the present invention, an image reading apparatus is provided which includes an exposure unit configured to expose an original; a reading unit configured to read an image of the original exposed by the exposure unit; and a determination unit configured to determine presence of a correction trace area having a whiteout applied on the original based on saturation of a density level of a surface of the original obtained when the original is read at a predetermined exposure amount by the reading unit.

According to an aspect of the embodiment, the image reading apparatus further may include an attribute information addition unit configured to add attribute information indicating a position of the correction trace area to the original image when the determination unit determines the presence of the correction trace area. According to another aspect of the present embodiment, the attribute information may be a bitmap data having a bit value indicating the correction trace area set to 1.

According to another embodiment of the present invention, an image reading apparatus is provided which includes an exposure unit configured to expose an original; a reading unit configured to read an image of the original exposed by the exposure unit; a selection unit configured to select one of a first mode of reading the original at a normal exposure amount and a second mode of reading the original at a predetermined exposure amount smaller than the normal exposure amount; and an attribute information generation unit configured to determine presence of a correction trace area having a whiteout applied on the original and to generate attribute information indicating a position of the correction trace area based on image data output from the reading unit when the second mode is selected by the selection unit.

According to another aspect of the embodiment, the image reading apparatus further may include an output unit configured to add the attribute information generated by the attribute information generation unit to image data of the original read at the normal exposure amount and to output the image data to another apparatus when the second mode is selected.

According to another embodiment of the present invention, an image processing apparatus for processing an image transferred from an image reading apparatus is provided. The image reading apparatus includes an exposure unit configured to expose an original; a reading unit configured to read an image of the original exposed by the exposure unit; and an attribute information generation unit configured to generate attribute information indicating a correction trace area having a whiteout applied on the original based on image data of the original read at a predetermined exposure amount by the reading unit. The image processing apparatus includes a receiving unit configured to receive the image data and the attribute information from the image reading apparatus; and an identification information generation unit configured to generate display image data identifying the correction trace area of the original image based on the image data and the attribute information.

According to another embodiment of the present invention, a method of controlling an image reading apparatus is provided which includes exposing an original at a predetermined exposure amount smaller than an exposure amount used during normal image reading; reading an image of the exposed original; and determining a presence of a correction trace area having a whiteout applied on the original based on saturation of a density level of a surface of the original obtained when the original is read at the predetermined exposure amount.

According to yet another embodiment of the present invention, a method of controlling an image reading apparatus is provided which includes selecting one of a first mode of reading an original at a normal exposure amount and a second mode of reading the original at a predetermined exposure amount smaller than the normal exposure amount; exposing the original at the predetermined exposure amount when the second mode is selected; reading an image of the exposed original; determining a presence of a correction trace area having a whiteout applied on the original based on the read image data; and; generating attribute information indicating a position of the correction trace area.

According to still yet another embodiment of the present invention, a method of controlling an image processing apparatus for processing an image transferred from an image reading apparatus is provided. The image reading apparatus includes an exposure unit configured to expose an original; a reading unit configured to read an image of the original exposed by the exposure unit; and an attribute information generation unit configured to generate attribute information indicating a correction trace area having a whiteout applied on the original based on image data of the original read at a predetermined exposure amount by the reading unit. The method includes receiving the image data and the attribute information from the image reading apparatus; and generating display image data identifying the correction trace area of the original image based on the image data and the attribute information.

According to still yet another embodiment of the present invention, a computer readable medium containing computer-executable instructions for controlling an image reading apparatus is provided. The computer readable medium includes computer-executable instructions for exposing an original at a predetermined exposure amount smaller than an exposure amount used during normal image reading; computer-executable instructions for reading an image of the exposed original; and computer-executable instructions for determining a presence of a correction trace area having a whiteout applied on the original based on saturation of a density level of a surface of the original obtained when the original is read at the predetermined exposure amount.

According to another embodiment of the present invention, a computer readable medium containing computer-executable instructions for controlling an image reading apparatus is provided. The computer readable medium includes computer-executable instructions for selecting one of a first mode of reading an original at a normal exposure amount and a second mode of reading the original at a predetermined exposure amount smaller than the normal exposure amount; computer-executable instructions for exposing the original at the predetermined exposure amount when the second mode is selected; computer-executable instructions for reading an image of the exposed original; computer-executable instructions for determining a presence of a correction trace area having a whiteout applied on the original based on the read image data; and computer-executable instructions for generating attribute information indicating a position of the correction trace area.

Further embodiments, features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments of the invention and, together with the description serve to explain the principles of the invention.

DETAILED DESCRIPTION OF THE EMBODIMENTS

Exemplary embodiments, features and aspects of the present invention will be described in detail below in accordance with the accompanying drawings.

Figure 1:
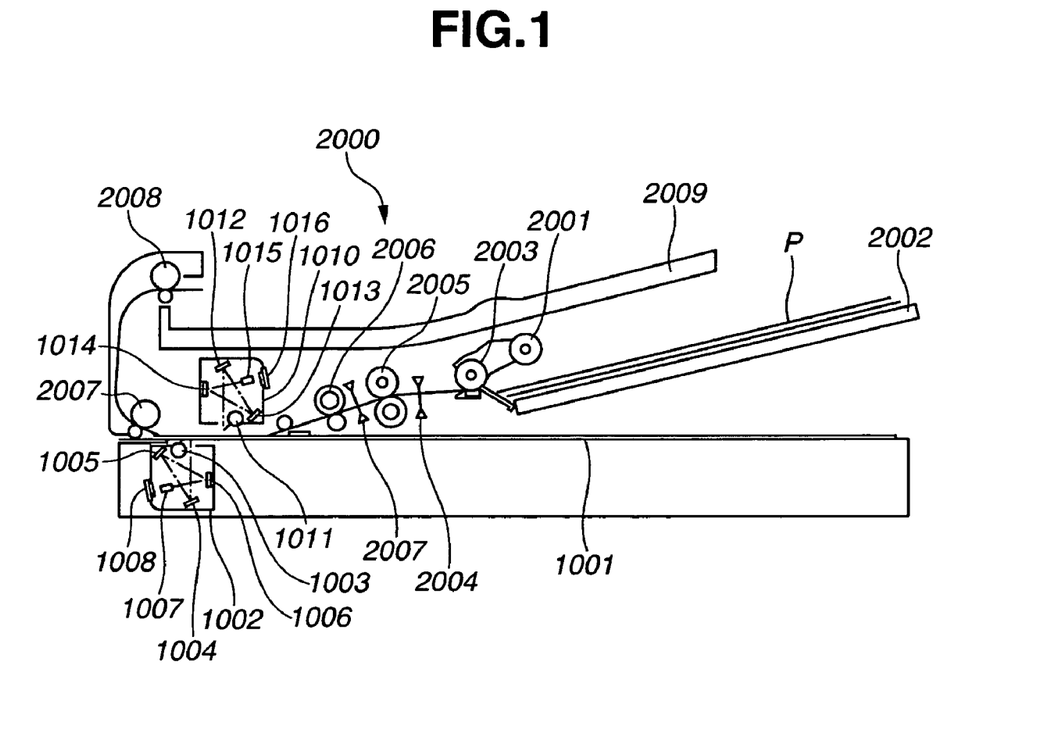
FIG. 1 is a sideview sectional schematic diagram of an exemplary image reading apparatus.

FIG. 1 is a sideview sectional schematic diagram of an exemplary image reading apparatus according to an embodiment of the present invention. An image of one side of an original being conveyed is irradiated with light from a light source 1003 disposed in a first reading unit 1002. Reflected light from the original forms an image on a CCD element 1008 by a lens 1007 while its optical path is bent through first, second and third mirrors 1004, 1005, and 1006 to be subjected to photoelectric conversion. Similarly, an image of the other side of the original being conveyed is irradiated with light from a light source 1011 disposed in a second reading unit 1010. Reflected light from the original forms an image on a CCD element 1016 by a lens 1015 while its optical path is bent through first, second, and third mirrors 1012, 1013 and 1014 to be subjected to photoelectric conversion.

An original positioned on an original base glass 1001 is read by the first reading unit 1002 moving in a horizontal direction (in FIG. 1) therebelow. An original feeder 2000 conveys the original P to be read by the first and second reading units 1002 and 1010.

First, a pickup roller 2001 is pressed into contact with the original P on an original tray 2002 by a press-contact unit (not shown). The original P is fed to a separation roller 2003 by the pickup roller 2001. A separation sensor 2004 is arranged on a downstream side of the separation roller 2003. When a separated original is detected by the separation sensor 2004, the pickup roller 2001 is separated up from the original P by a separation unit (not shown). Subsequently, the pickup roller 2001 is pressed into contact with the original P on the original tray 2002 again. With these operations repeated, the originals P on the original tray 2002 are fed one by one. A registration sensor 2007 is arranged near an upstream side of a registration roller 2006. When the registration sensor 2007 detects the original, loop control is carried out to generate a loop in the original P so that oblique traveling can be corrected at a conveying roller 2005 and the registration roller 2006. Then, an image of the original P is read by the first and second reading units 1002 and 1010. The original P is passed on a conveying roller 2007 and ejected to a discharge tray 2009 by a discharging roller 2008.

Figure 2A:
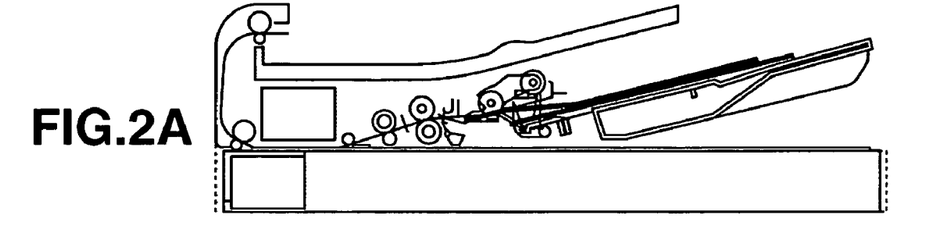
FIGS. 2A to 2E are more sideview sectional schematic diagrams illustrating an operation for reading an original.
Figure 2B:
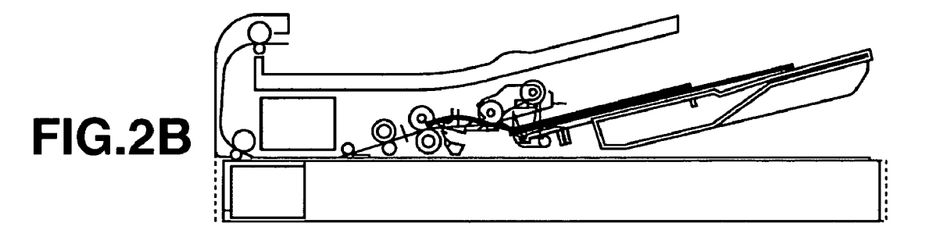
Figure 2C:
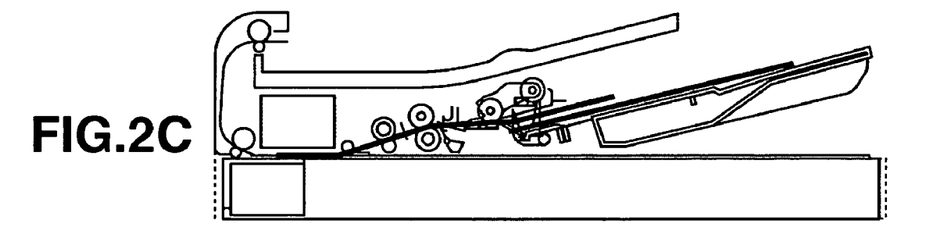
Figure 2D:
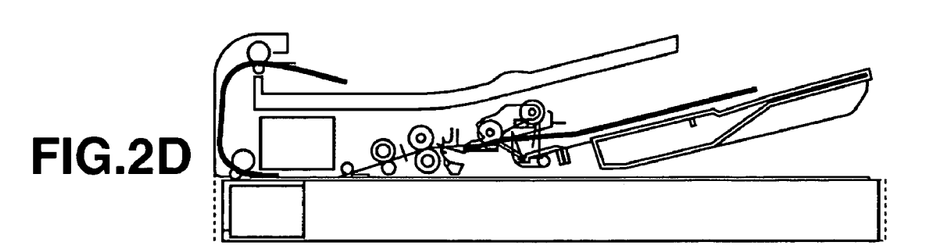
Figure 2E:
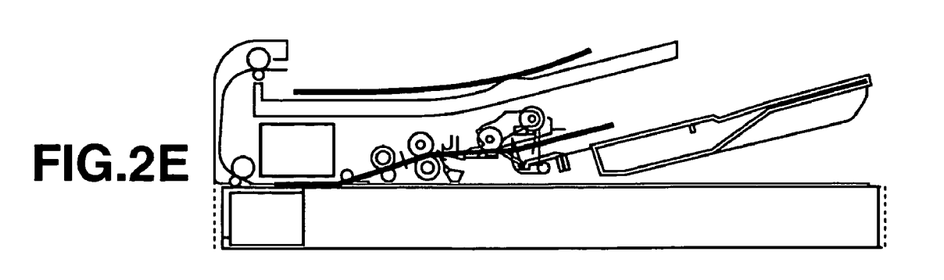

Next, control for reading one side alone of the original will be described. In a one-sided reading mode, the second reading unit 1010 is used while the first reading unit 1002 is not. First, originals P are separated one by one to be fed from a bundle of originals on the original tray 2002 by the pickup roller 2001 and the separation roller 2003 (FIG. 2A). The fed original P is conveyed until the tip thereof reaches the registration sensor 2007. Subsequently, with turning-on of the registration sensor 2007 used as a trigger, the original is fed by a distance equal to a total (A+B) of a distance A to the registration roller 2006 and a loop amount B, and stopped (FIG. 2B). After an end of the loop control, feeding is carried out from the registration roller 2006. After the tip of the original P reaches a predetermined position in a reading area of the second reading unit 1010, the original is read by the second reading unit 1010 (FIG. 2C). After feeding from the registration roller 2006, separation of the next original is started with nondetection of the original by the separation sensor 2004 (detection of the rear end of the original) used as a trigger (FIG. 2D). The read original is conveyed by the discharging roller 2007 to be discharged to the discharge tray 2009 (FIG. 2E). This control is repeated until there is no more bundle of originals left on the original tray 2002.

Next, control for reading both sides of an original will be described. In a two-sided reading mode, both the first and second reading units 1002 and 1010 are used. First, as in the case of the one-sided reading mode, originals P are separated one by one to be fed from a bundle of originals on the original tray 2002 by the pickup roller 2001 and the separation roller 2003 (FIG. 2A). The fed original P is conveyed until the tip thereof reaches the registration sensor 2007. Subsequently, with detection of the tip of the original by the registration sensor 2007 used as a trigger, the original is conveyed by a distance equal to a total (A+B) of a distance A to the registration roller 2006 and a loop amount B, and stopped (FIG. 2B). After an end of the loop control, feeding is carried out from the registration roller 2006. After the tip of the original P reaches a predetermined position of the second reading unit 1010, reading is started by the second reading unit 1010. When the tip of the original P reaches a predetermined position of the first reading unit 1002, reading is started by the first reading unit 1002 (FIG. 2C). After an end of the feeding from the registration roller 2006, separation of the next original is started with nondetection of the original by the separation sensor 2004 for the rear end of the original P used as a trigger (FIG. 2D). The original P read by the first and second reading units 1002 and 1010 is conveyed by the discharging roller 2007 to be discharged to the discharge tray 2009 (FIG. 2E). These operations are repeated until there are no more originals left on the original tray 2002.

Figure 4:
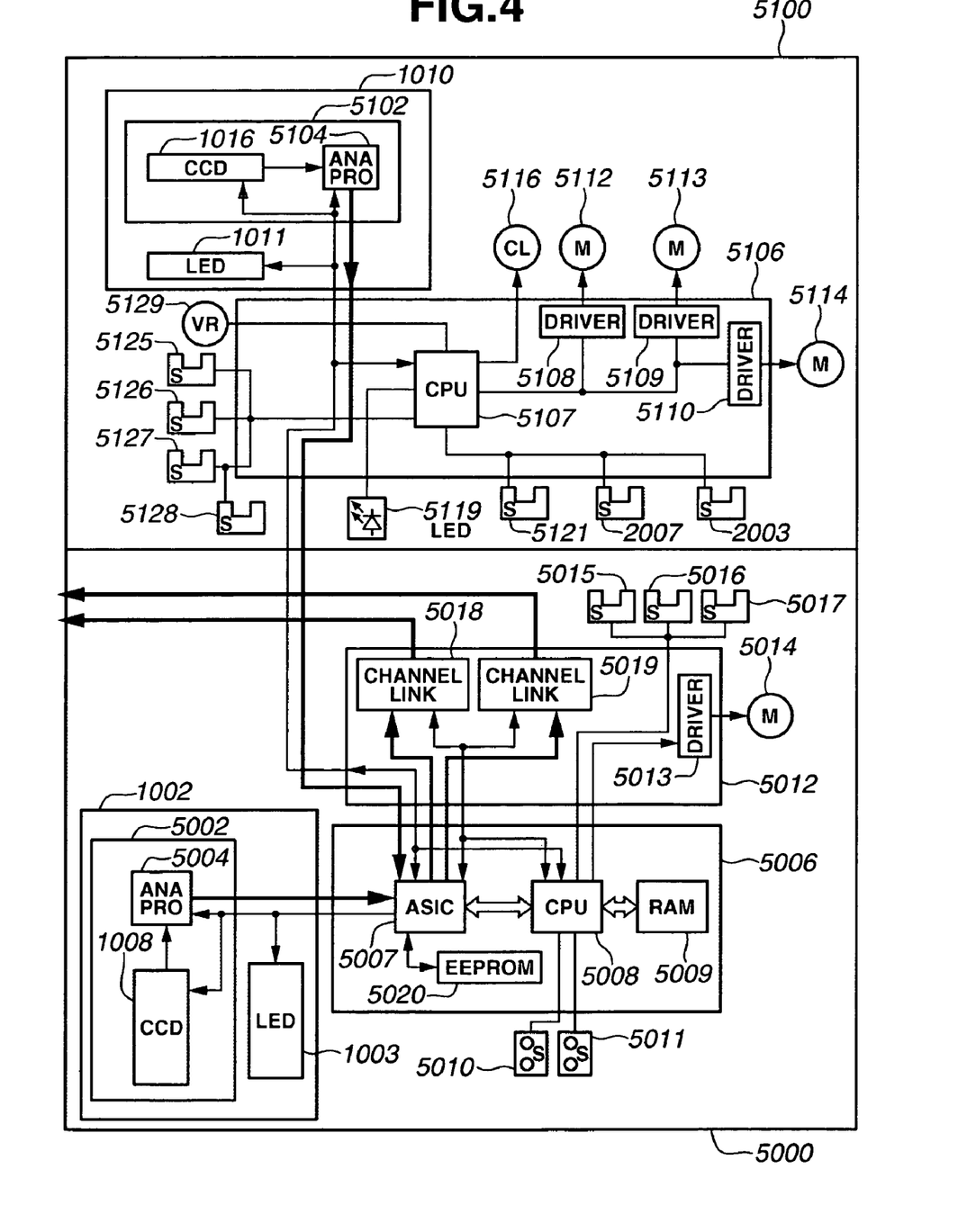
FIG. 4 is a block diagram illustrating circuitry of an exemplary reading unit.

FIG. 4 is a block diagram illustrating exemplary circuitry of the image forming apparatus according to the embodiment. The apparatus of the embodiment is generally divided into a reader 5000 having a first image reading unit 1002 and an auto-document feeder (ADF) 5100 having a second image reading unit 1010.

The reader 5000 includes the first image reading unit 1002, and reflective type original size detection sensors 5010 and 5011 for detecting the size of an original mounted on the original base glass 1001. The reader 5000 further includes an optical motor 5014 for moving the first image reading unit 1002 in a subscanning direction, sensors 5015 and 5016 for detecting opening/closing of the ADF 5100, and a sensor 5017 for detecting a position reference of the first image reading unit 1002 in the subscanning direction. The reader 5000 further includes a control board 5006 for controlling each load, and an interface board 5012 which servers both as an interface with each load and an interface for outputting image data read by the first image reading unit 1002 to the external.

The first image reading unit 1002 includes a board 5002 and an LED light source 1003 for illuminating an original. The board 5002 has a CCD 1008 and an analog processor IC 5004 for digitizing analog image data read by the CCD 1008.

An ASIC (application specific integrated circuit) 5007 is disposed on the control board 5006 to mainly execute image processing for image data read by the first and second image reading units 1002 and 1010. A CPU 5008, and an EEPROM 5020, an RAM 5009 and the like are further mounted on the control board 5006 respectively to control the entire apparatus and to store backup data.

A driver IC 5013 for the optical motor 5014, and a channel link IC 5018/5019 or the like which serves as an interface for outputting the image data subjected to image processing by the ASIC 5007 to the external are mounted on the interface board 5012. The image data read by the first and second image reading units 1002 and 1010 are respectively output to the external by different systems through the IC 5018 and the IC 5019.

The ADF 5100 includes the second image reading unit 1010, an original detection sensor 5127 for detecting an original arranged on the original tray 2002, a width detection volume (sensor) 5129 for detecting the width of an original, determination sensors 5125 and 5126 for determining the size of an original, and a cover opening/closing sensor 5128 for detecting opening/closing of an exterior to be opened/closed for jamming processing. The ADF 5100 further includes a display LED 5119 for displaying loading of originals on the original tray 2002, a separation sensor 2003 installed on an original conveying path, a registration sensor 2007, and a discharge sensor 5121. The ADF 5100 further includes a feed motor 5112 for driving the separation roller 2003 and the conveying roller 2005, a clutch 5116 for transmitting the driving of the feed motor 5112 to the pickup roller 2001, a read motor 5113 for driving the registration roller 2006 and the conveying roller 2007, and a discharge motor 5114 for driving the discharging roller 2008 to discharge an original to the discharge tray 2009. The ADF 5100 yet further includes a control board 5106 for controlling each load.

The second image reading unit 1010 includes a board 5102 and an LED light source 1011 for illuminating an original. The board has a CCD 1016 and an analog processor IC 5104 for digitizing analog image data read by the CCD 1016.

IC 5108, IC 5109, IC 5110 and the like, each of which is a driver IC for each motor, is mounted on the control board 5106, and each load is controlled by the CPU 5107. The CPU 5107 receives a command from the main CPU 5008 on the control board 5006 of the reader 5000 to control each load.

Figure 3:
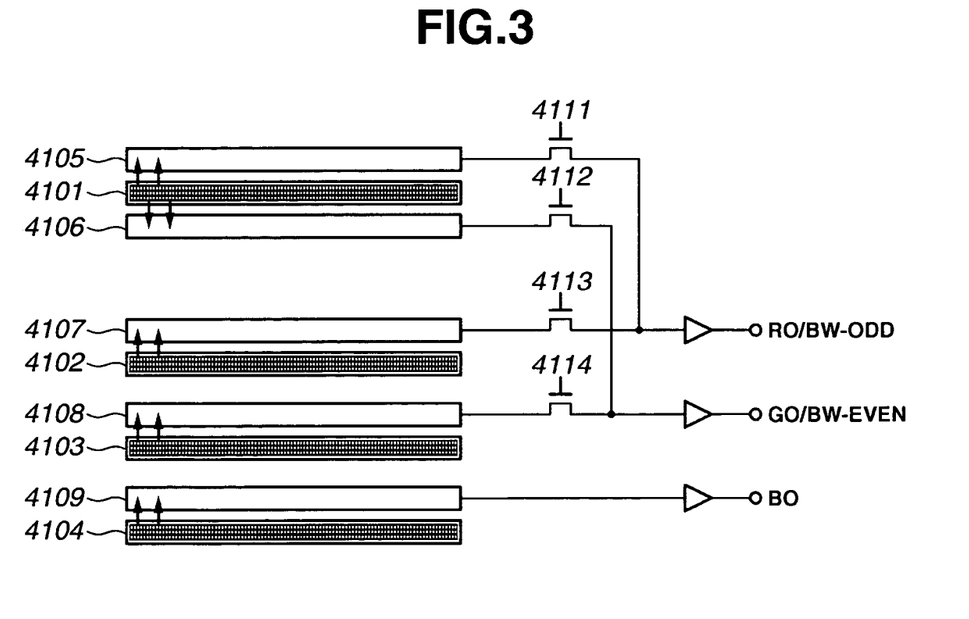
FIG. 3 is a diagram illustrating a CCD sensor.

FIG. 3 is a diagram illustrating the CCD sensor 1008 according to the embodiment. The CCD image sensor 1008 is constituted of a 4-line sensor. Reading an image in a color mode will now be described. When an image is read in the color mode, switches 4113 and 4114 are turned on while switches 4111 and 4112 are turned off. Reference numerals 4102, 4103, and 4104 denote respectively red, green, and blue photosensitive element rows. After each photosensitive element row receives reflected light from an original, charges are transferred to a charge transfer unit with a shift pulse. Reference numeral 4107 denotes a charge transfer unit for red, and an RO signal is output by an amount equal to one line from an output unit through the switch 4113. Reference numeral 4108 denotes a charge transfer unit for green, and a GO signal is output from an output unit through the switch 4114. Reference numeral 4109 denotes a charge transfer unit for blue, and a BO signal is output from an output unit.

Next, reading an image in a black and white mode will be described. When an image is read in the black and white mode, the switches 4113 and 4114 are turned off while the switches 4111 and 4112 are turned on. Reference numeral 4101 denotes a photosensitive element row for black and white. A charge transfer unit 4105 is configured to transfer charges of a photosensitive element of an odd side of the photosensitive element row 4101, and a charge transfer unit 4106 is configured to transfer charges of a photosensitive element of an even side of the photosensitive element row 4101. High-speed reading is carried out by this configuration. A BW-ODD signal is output from the charge transfer unit 4105 through the switch 4111, and a BW-EVEN signal is output from the charge transfer unit 4106 through the switch 4112. It should be noted that the black and white photosensitive element row is higher in sensitivity than the color photosensitive element row because no color filter is formed on the black and white photosensitive element row. Thus, an influence of noise is limited even when storage time is reduced to execute high-speed reading. By employing this configuration, in the black and white mode, it is possible to read an image at a higher speed even with an applied light quantity equal to that in the color mode.

Figure 7:
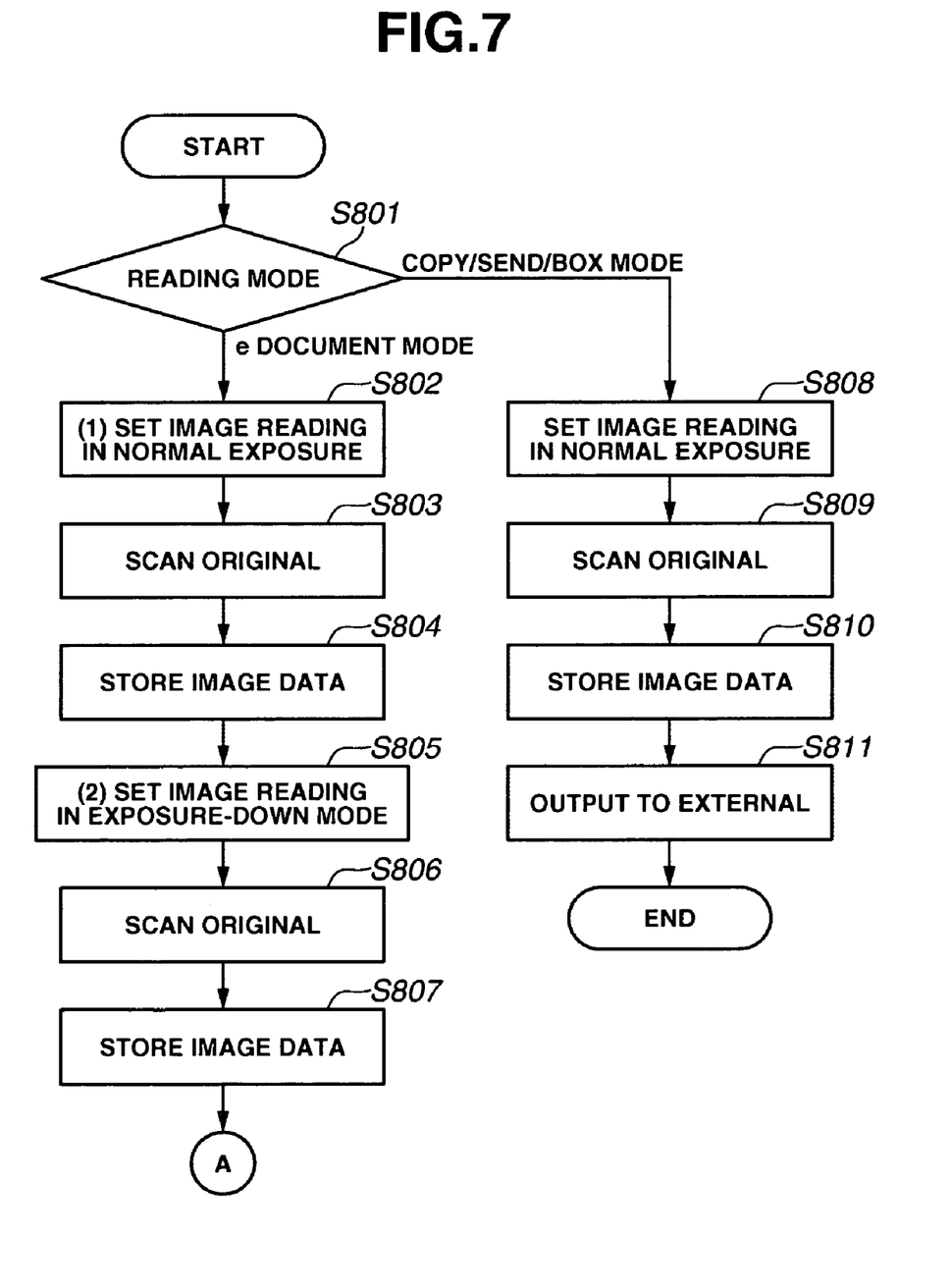
FIG. 7 is a flowchart illustrating an exemplary reading mode.

FIG. 7 is a flowchart illustrating an exemplary image reading sequence according to the embodiment. First, a determination is made as to whether a set reading mode is an "e document mode" or a "normal mode" (step S801) . The e document mode is a reading mode capable of faithfully reproducing three-dimensional information of a shadow or the like caused by cutting and pasting of an original or a whiteout. In other words, it is a reading mode for detecting a correction trace. The normal mode is a conventional normal reading mode for preventing reproduction of the shadow of the original as much as possible.

Figure 8:
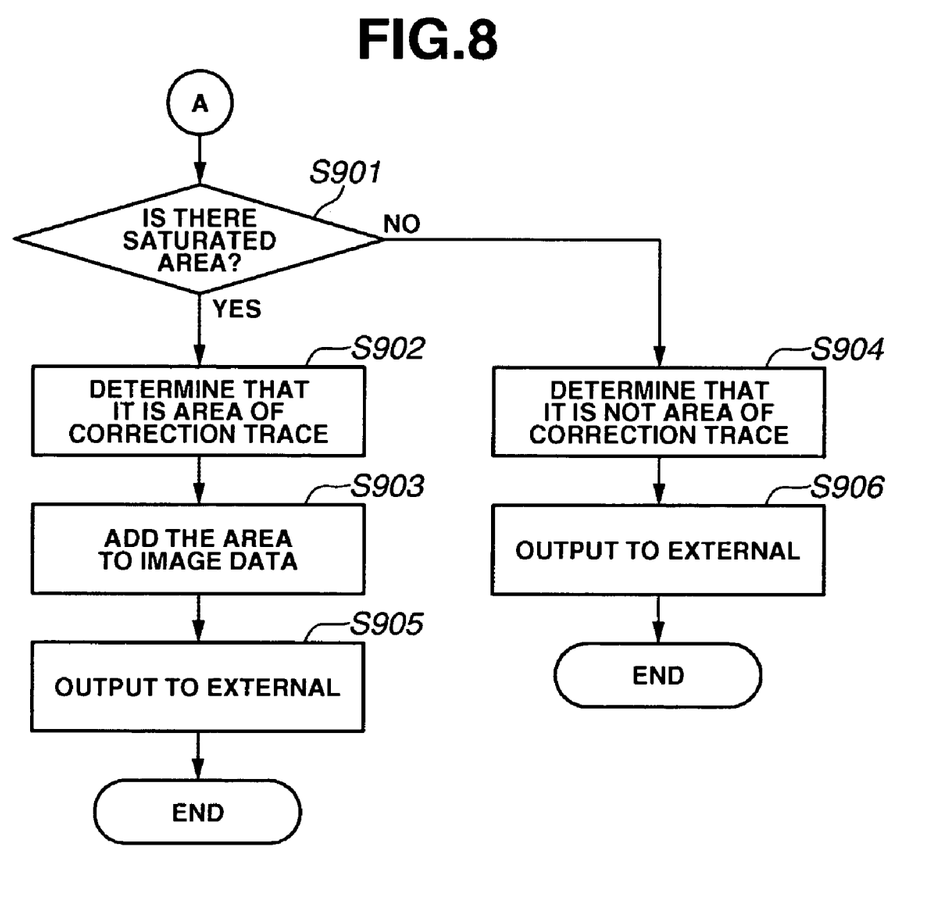
FIG. 8 is a flowchart illustrating exemplary determination of a correction trace area.

If the reading mode is an e document mode, reading is carried out twice. For the first reading, image reading conditions in normal exposure are set (step S802). Then, an original is scanned based on the set conditions (step S803), and read image data is stored in the RAM 5009 (step S804). Subsequently, for the second reading, image reading conditions in an exposure-down mode described below are set (step S805). Then, the original is scanned based on the set conditions (step S806). Read image data is correlated with the image data stored in step S804 and is stored in the RAM 5009 (step S807). Subsequently, a process shown in FIG. 8 is executed. Further, it is noted steps S802 and S805 may be switched in order.

If a reading mode set next is a normal mode, reading is carried out once. First, image reading conditions in normal exposure are set (step S808). Then, an original is scanned based on the set conditions (step S809). Read image data is stored in the RAM 5009 (step S810) and is subsequently output to an external device (step S811).

Figure 9:
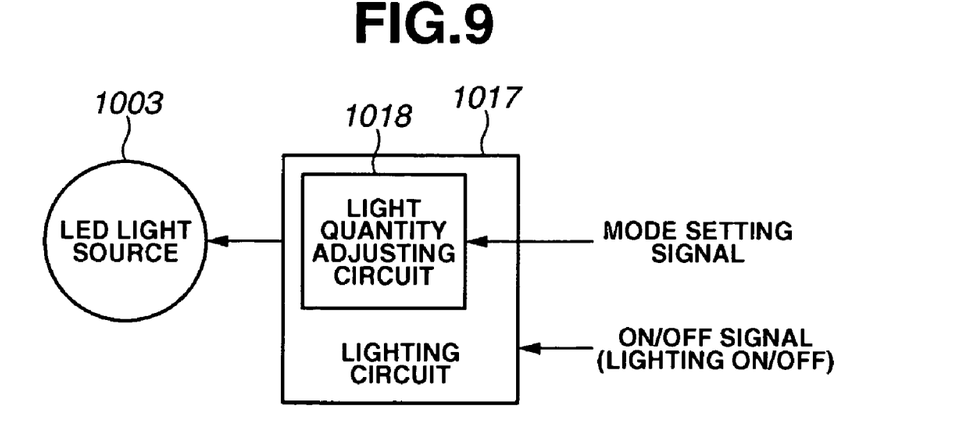
FIG. 9 is a diagram illustrating an exemplary light quantity adjustment.

FIG. 9 is a schematic diagram of a circuit for reducing exposure during the exposure-down mode setting in step S805. In this circuit, a light quantity of the light source is reduced. A lighting circuit 1017 receives an ON/OFF signal for turning on or off the light source and a mode setting signal for controlling exposure. The ON/OFF signal and the mode setting signal are set by the CPU 5008 or the ASIC 5007. The mode setting signal is for setting a reading mode such as the e document mode or the normal mode, and is received by a light quantity adjustment circuit 1018 in the lighting circuit 1017. The light quantity adjustment circuit 1018 lights the LED light source 1003 at a light quantity corresponding to the received mode setting signal. When exposure-down is set in the e document mode, a light quantity of the LED light source 1003 is reduced by 15% from that in the normal mode. According to the embodiment, the light quantity is reduced by 15%. However, a reduction ratio should preferably take a proper value depending on an apparatus, and thus a numerical value is not limited to 15%.

There is another available method of reducing exposure, which reduces exposure by increasing a driving pulse cycle of the CCD 1008 set by the ASIC 5007 by 15% from that in the normal mode during the exposure-down mode setting. According to the embodiment, the driving pulse cycle is increased by 15% to reduce exposure. However, a cycle increasing ratio should preferably take a proper value depending on an apparatus, and thus a numerical value is not limited to 15%.

FIG. 8 is a flowchart illustrating an exemplary sequence of determining a correction trace area according to the embodiment, which is carried out after the processing of step S807 of FIG. 7. First, a determination is made as to whether there is a density-saturated area or not in the image data read in the exposure-down mode and stored in the RAM 5009 (step S901). If there is a saturated area, this area is determined to be a correction trace area (step S902). Then, attribute data indicting the area is generated and added to the read image data (step S903). The image data is then output to the external (step S905). Regarding a form of the attribute data, for example, an area for storing binary image data equal in size to an original image is prepared, a bit of the same area as that determined to be a correction trace area is set to 1, and bits of the other areas are set to 0. In other words, a correction trace area is specified based on bitmap data. For example, resolution may be lowered to reduce a data amount indicating a correction trace area, thereby setting a bitmap lower by 50% in size than an original image.

If there is no saturated area, no correction trace area is determined (step S904), and image data is output to the external (step S906) to finish the process.

For determination of saturation of the image data, in the case of 8-bit image data, pixels thereof are determined to be saturated if color values of RGB are 255, 255, and 255 in decimal number. It has been found by experiment that a place corrected by applying a whiteout is different in surface whiteness from other places, and color values of RGB all become 255 to be saturated. According to the embodiment, image reading is executed not only in the normal exposure mode but also in the exposure-down mode, and saturation of surface whiteness is determined based on both of the image data obtained in the two modes. Hence, it is possible to surely detect application of a whiteout.

Figure 10:
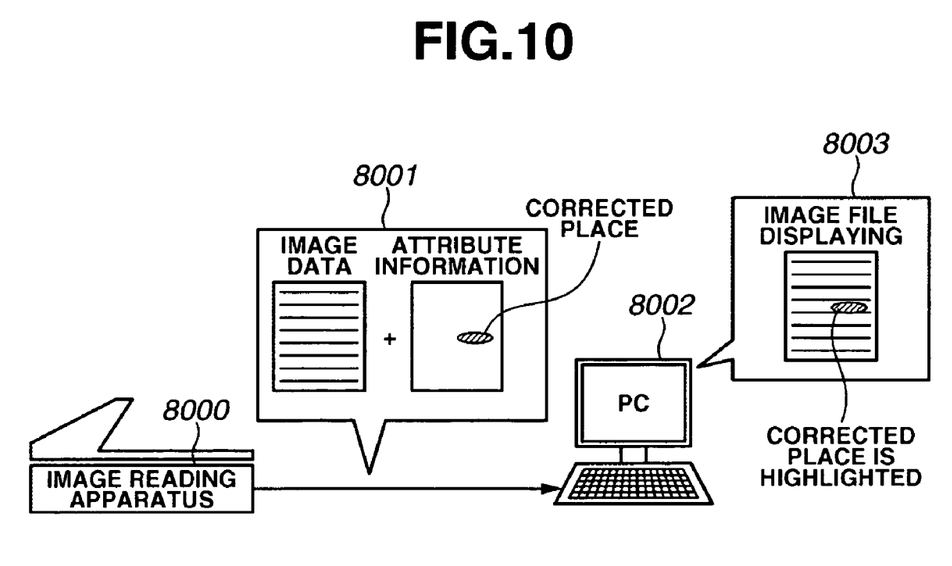
FIG. 10 is a diagram illustrating exemplary image file displaying on a PC screen.

FIG. 10 is a diagram illustrating a state in which an image file read in the e document mode is displayed on a screen of a personal computer or the like. Image data read in the e document mode is transferred as image data 8001 having attribute information such as a position/area of a correction trace added thereto from an image reading apparatus 8000 to a personal computer (PC) 8002. In the PC 8002, an area having a correction trace is determined based on the attribute information. In other words, apart of 1 of bitmap data contained in the attribute information is determined to be a correction trace area. Image data 8003 is generated by processing such as changing of a display color of the determined area, and gradation characteristics of an image portion near the correction trace are corrected to highlight presence of the correction trace.

According to the embodiment, a mode for reading an image in the normal exposure mode is set as the normal mode, and a mode for reading an image in both of the normal exposure mode and the exposure-down mode having reduced exposure is set as the e document mode.

Figure 5:
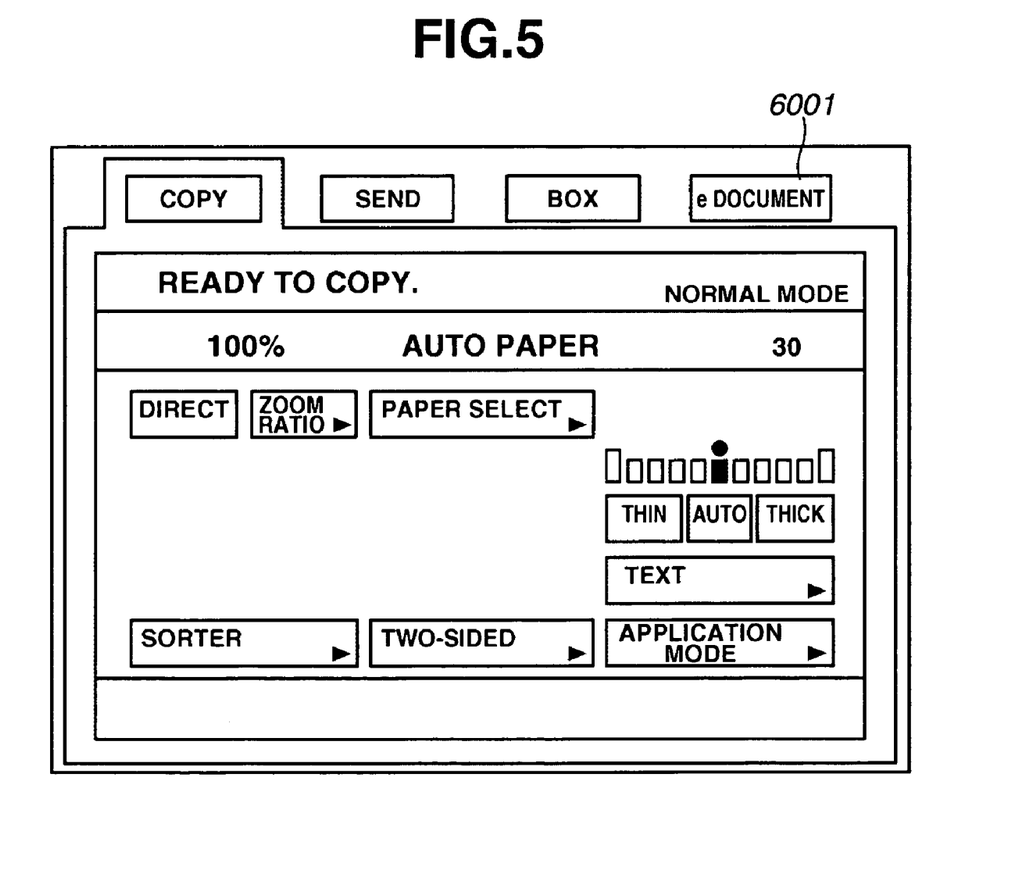
FIG. 5 is a diagram illustrating an exemplary operation unit screen in a normal mode.
Figure 6:
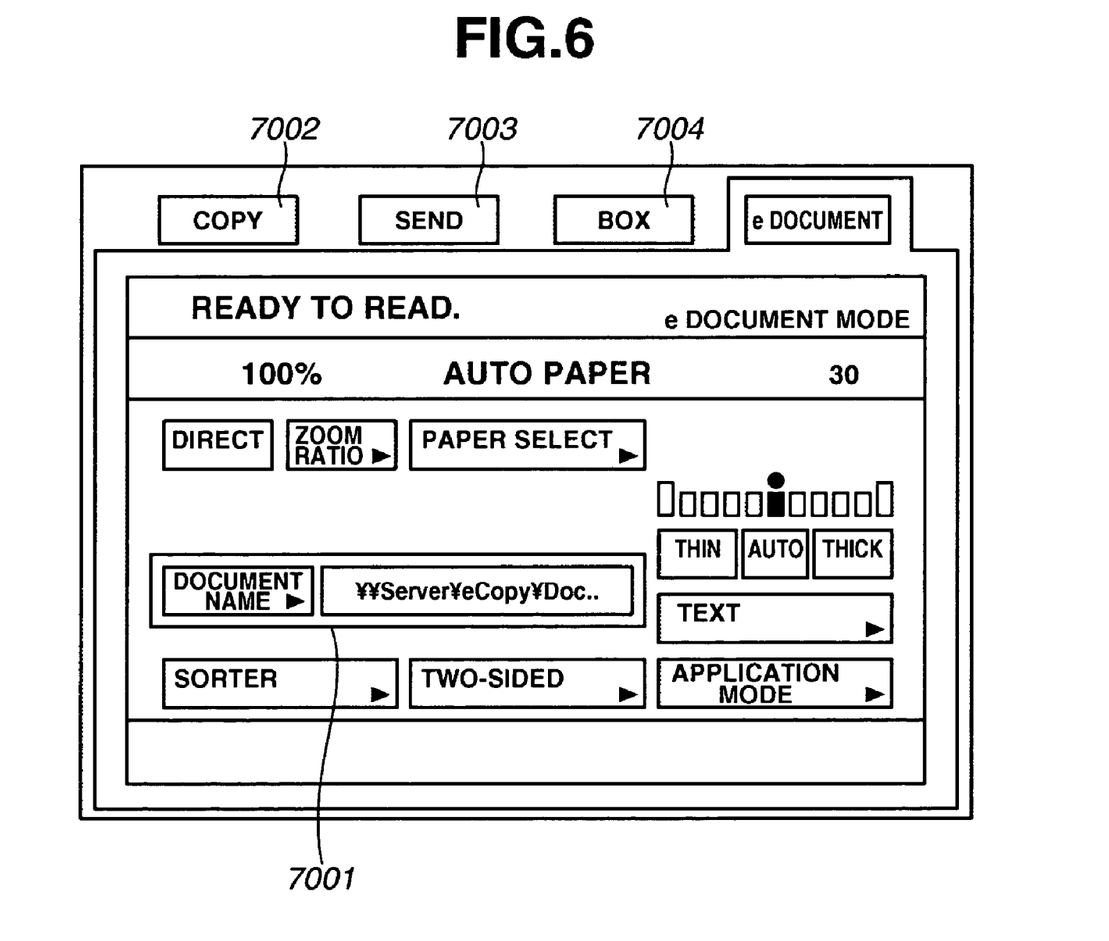
FIG. 6 is a diagram illustrating an exemplary operation unit screen in an e-Document mode.

FIGS. 5 and 6 illustrate exemplary operation screens for selecting the normal mode and the e document mode. Both are screens displayed on an operation unit of an external controller. FIG. 5 shows an operation screen displayed on the operation unit when the normal mode is selected. To select the e document mode, an e document mode button 6001 in an upper part of the screen is pressed. When the e document mode button 6001 is pressed, the screen of the operation unit is switched to a screen such as that shown in FIG. 6. In the e document mode, the read original is stored as an image file. Accordingly, an operator writes a place of storing a document file and a file name in a document name box 7001. In this state, when the operator presses a start button (not shown), an operation of reading an original is started. When one of a COPY button 7002, a SEND button 7003, and a BOX button 7004 in an upper part of the screen of FIG. 6 is pressed, the reading mode is switched to the normal mode to change to a setting screen of designated functions. As an example, when the COPY button 7002 is pressed, the screen is switched to that shown in FIG. 5.

In place of determining the presence of a correction trace at the image reading apparatus side, the presence of a correction trace may be determined by a program at the PC side. In this case, it is only necessary to transmit both of an image read at a normal exposure amount and an image read in the exposure-down mode to the PC side.

According to the embodiment, an LED light source is used to illuminate an original. Needless to say, however, it will be no problem if a xenon lamp, a halogen lamp, a fluorescent lamp or the like is used as a light source. A CCD is used as an image reading element. However, it will be no problem if a contact image sensor (CIS) is employed as the image reading element.

The embodiment has been described by way of example of a color scanner. However, a monochromatic scanner may be used.

Additionally, the present invention is achieved by supplying a storage medium recording program code of software to realize the functions of the embodiment to a system or an apparatus, and causing a computer (or CPU, MPU or the like) of the system or the apparatus to read and execute the program code stored in the storage medium.

In this case, the program code read from the storage medium realizes the functions of the embodiment, and the program code and the storage medium storing the program code constitute the present invention.

As the storage medium for storing the program code, for example, a floppy disk (registered trademark), a hard disk, a magneto-optical disk, a CD-ROM, a CD-R, a CD-RW, a DVD-ROM, a DVD-RAM, a DVD-RW, a DVD+RW, a magnetic tape, a nonvolatile memory card, a ROM, or the like can be used. Alternatively, the program code may be downloaded via a network.

A case where not only the computer executes the read program code to realize the functions of the embodiment but also an operating system (OS) or the like running on a computer executes a part or all parts of the actual process based on instructions of the program code to realize the functions of the embodiment is also covered by the invention.

Furthermore, a case where the program code read from the storage medium is written in a memory disposed in a function expansion board inserted into a computer or a function expansion unit connected to a computer, and then a CPU or the like of the function expansion board or the function expansion unit executes a part or all parts of the actual process based on instructions of the program code to realize the functions of the embodiment is also covered by the invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2005-109893 filed Apr. 6, 2005, which is hereby incorporated by reference herein in its entirety.

What is claimed is:

1. An image reading apparatus comprising:
   an exposure unit configured to expose an original reading position;
   a reading unit configured to read an image of the original at the original reading position exposed by the exposure unit;
   a selection unit configured to select one of a first mode of reading the original exposed at a normal exposure amount and a second mode of reading the original exposed at a predetermined exposure amount smaller than the normal exposure amount; and
   an attribute information generation unit configured to determine presence of a correction trace area having a whiteout applied on the original and to generate attribute information indicating a position of the correction trace area based on image data output from the reading unit when the second mode is selected by the selection unit.

2. The image reading apparatus according to claim 1, further comprising an output unit configured to add the attribute information generated by the attribute information generation unit to image data of the original read at the normal exposure amount and to output the image data to another apparatus when the second mode is selected.

3. A method of controlling an image reading apparatus, comprising:
   exposing an original at a predetermined exposure amount smaller than an exposure amount used during normal image reading;
   reading an image of the exposed original; and
   determining a presence of a correction trace area having a whiteout applied on the original based on saturation of a density level of a surface of the original obtained when the original is read at the predetermined exposure amount.

4. A method of controlling an image reading apparatus, comprising:
   selecting one of a first mode of reading an original at a normal exposure amount and a second mode of reading the original at a predetermined exposure amount smaller than the normal exposure amount;
   exposing the original at the predetermined exposure amount when the second mode is selected;
   reading an image of the exposed original;
   determining a presence of a correction trace area having a whiteout applied on the original based on the read image data; and
   generating attribute information indicating a position of the correction trace area.

5. A computer readable medium containing computer-executable instructions for controlling an image reading apparatus, the computer readable medium comprising:
   computer-executable instructions for exposing an original at a predetermined exposure amount smaller than an exposure amount used during normal image reading;
   computer-executable instructions for reading an image of the exposed original; and computer-executable instructions for determining a presence of a correction trace area having a whiteout applied on the original based on saturation of a density level of a surface of the original obtained when the original is read at the predetermined exposure amount.

6. A computer readable medium containing computer-executable instructions for controlling an image reading apparatus, the computer readable medium comprising:

computer-executable instructions for selecting one of a first mode of reading an original at a normal exposure amount and a second mode of reading the original at a predetermined exposure amount smaller than the normal exposure amount;

computer-executable instructions for exposing the original at the predetermined exposure amount when the second mode is selected;

computer-executable instructions for reading an image of the exposed original;

computer-executable instructions for determining a presence of a correction trace area having a whiteout applied on the original based on the read image data; and computer-executable instructions for generating attribute information indicating a position of the correction trace area.

7. An image reading apparatus comprising:

an exposure unit configured to expose an original reading position;

a reading unit configured to read an image of an original at the original reading position exposed by the exposure unit;

a setting unit configured to set a detection mode in which a white out applied on the original is detected;

a control unit configured to perform a first reading processing in which the original exposed at a first exposure amount by the exposure unit is read and to perform a second reading processing in which the original exposed at a second exposure amount smaller than the first exposure amount by the exposure unit is read in accordance with the detection mode being set by the setting unit;

a determination unit configured to determine presence of a correction trace area having a whiteout applied on the original based on the image data read by the second reading processing and to generate an attribute information indicating a position of the correction trace area to the original image; and an output unit configured to add the attribute information generated by the determination unit to image data read by the first reading processing and to output the image data to another apparatus in accordance with the detection mode being set by the setting unit.

8. An image reading apparatus comprising:

an exposure unit configured to expose an original reading position;

a reading unit configured to read an image of an original at the original reading position exposed by the exposure unit;

a control unit configured to perform a first reading processing in which the original exposed at a first exposure amount by the exposure unit is read and to perform a second reading processing in which the original exposed at a second exposure amount smaller than the first exposure amount by the exposure unit is read; and a determination unit configured to determine presence of a correction trace area having a whiteout applied on the original based on the image data read by the second reading processing and to generate an attribute information indicating a position of the correction trace area to the original image.

* * * * *